(12) United States Patent
Sulistio et al.

(10) Patent No.: US 9,819,837 B2
(45) Date of Patent: Nov. 14, 2017

(54) COLOR CORRECTION AND SELECTION OF COLOR PATCHES AND CORRECTION THRESHOLDS IN A COLOR MANAGEMENT SYSTEM, NON-TRANSITORY COMPUTER READABLE MEDIUM, AND COLOR MANAGEMENT METHOD

(71) Applicant: FUJI XEROX CO., LTD., Tokyo (JP)

(72) Inventors: Pauvi Sulistio, Kanagawa (JP); Shinya Takaishi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/009,018

(22) Filed: Jan. 28, 2016

(65) Prior Publication Data

US 2017/0048422 A1   Feb. 16, 2017

(30) Foreign Application Priority Data

Aug. 11, 2015 (JP) .................. 2015-159115

(51) Int. Cl.
*G01J 3/46* (2006.01)
*G01J 3/52* (2006.01)
*H04N 1/60* (2006.01)
*H04N 1/00* (2006.01)

(52) U.S. Cl.
CPC ....... *H04N 1/6041* (2013.01); *H04N 1/00023* (2013.01); *H04N 1/00034* (2013.01); *H04N 1/6033* (2013.01); *H04N 2201/0094* (2013.01)

(58) Field of Classification Search
CPC .. G01J 3/46; G01J 3/462–3/467; G01J 3/524; G01J 3/0251; H04N 1/6041; H04N 1/00023; H04N 1/00034; H04N 1/6058; H04N 1/6066; H04N 9/3182

USPC ......................................... 358/1.9
See application file for complete search history.

(56) References Cited

U.S. PATENT DOCUMENTS

| 2004/0239935 | A1* | 12/2004 | Kitazawa | G01J 3/46 356/406 |
| 2005/0243335 | A1* | 11/2005 | Giesselmann | H04N 1/6033 358/1.9 |
| 2008/0144060 | A1* | 6/2008 | Ishikawa | H04N 1/6027 358/1.9 |
| 2011/0109925 | A1 | 5/2011 | Hoshii | |
| 2011/0299073 | A1 | 12/2011 | Sakurai | |
| 2011/0299101 | A1* | 12/2011 | Namikata | H04N 1/6058 358/1.9 |
| 2012/0150471 | A1* | 6/2012 | Muto | G01J 3/462 702/104 |

FOREIGN PATENT DOCUMENTS

| JP | 2011-101254 A | 5/2011 |
| JP | 2011-101255 A | 5/2011 |
| JP | 2011-252790 A | 12/2011 |

* cited by examiner

*Primary Examiner* — Benny Q Tieu
*Assistant Examiner* — Juan M Guillermety
(74) *Attorney, Agent, or Firm* — Sughrue Mion, PLLC

(57) ABSTRACT

A color management system includes a measurement unit and a controller. The measurement unit measures a color difference between multiple colorimeters by using at least one detection color patch in accordance with colorimetry conditions used for the colorimeters. The controller generates, in a case where the color difference between the colorimeters is equal to or higher than a threshold for the detection color patch, a correction profile for correcting the color difference between the colorimeters.

10 Claims, 8 Drawing Sheets

FIG. 2
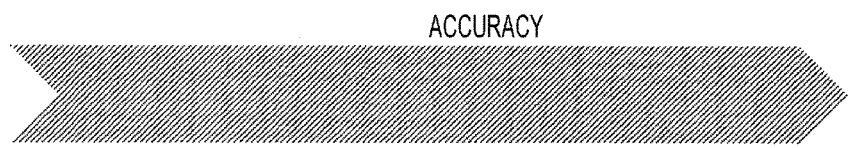
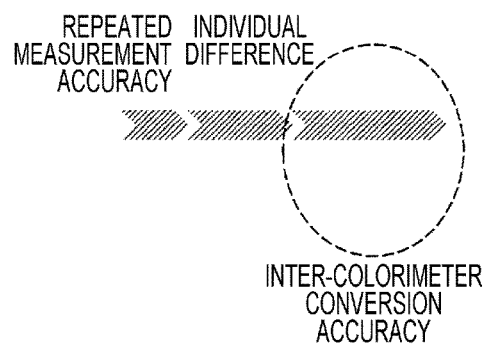
FIG. 3
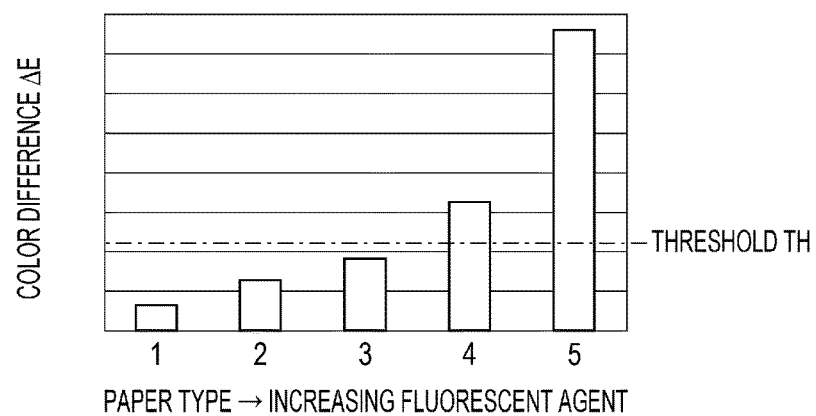

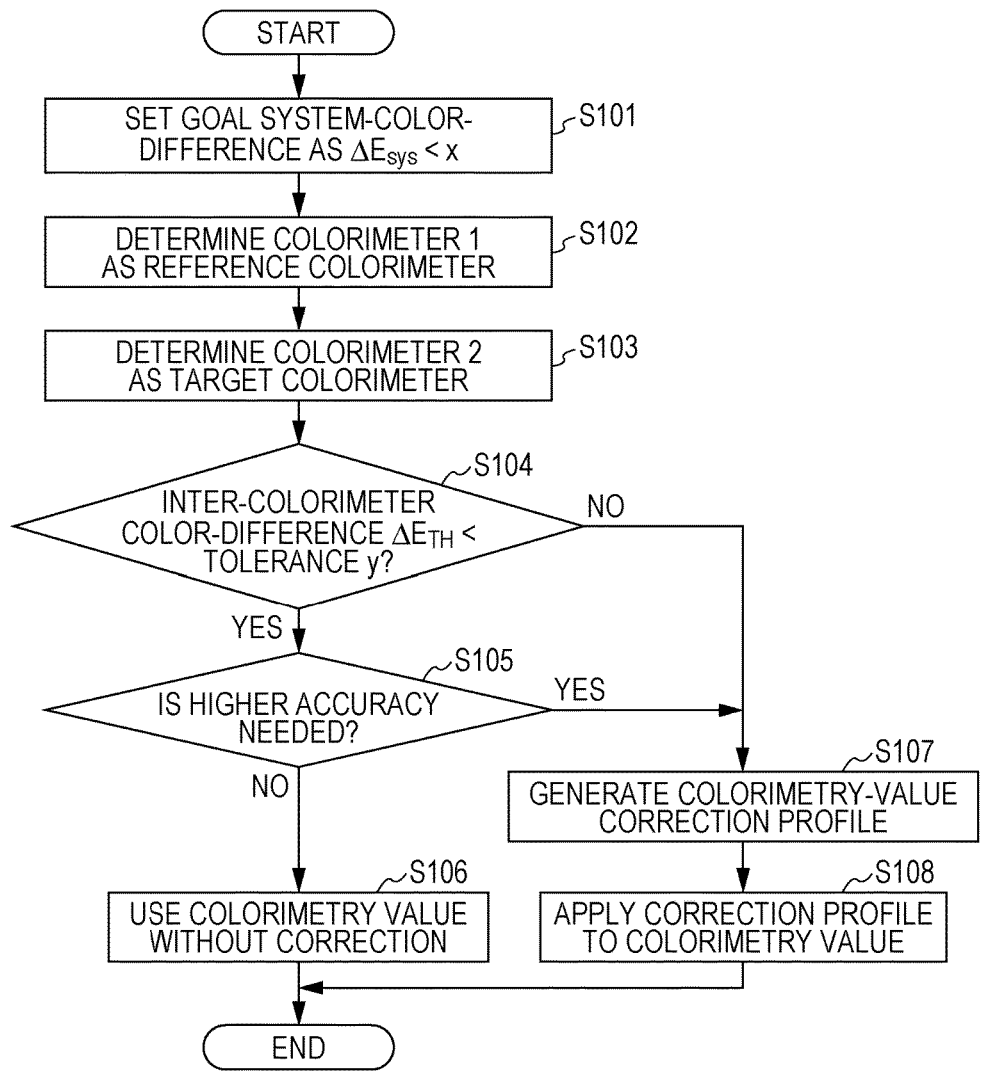

FIG. 8
| PREDICTED-COLOR-DIFFERENCE FORMULA | SAME TYPE | MIXED TYPE |
|---|---|---|
|  | WHITE | WHITE        C 100% |
| M0-M0<br>M2-M2 | FORMULA 1 | FORMULA 3 |
| M0-M2 | FORMULA 2 | FORMULA 4 |
FIG. 9
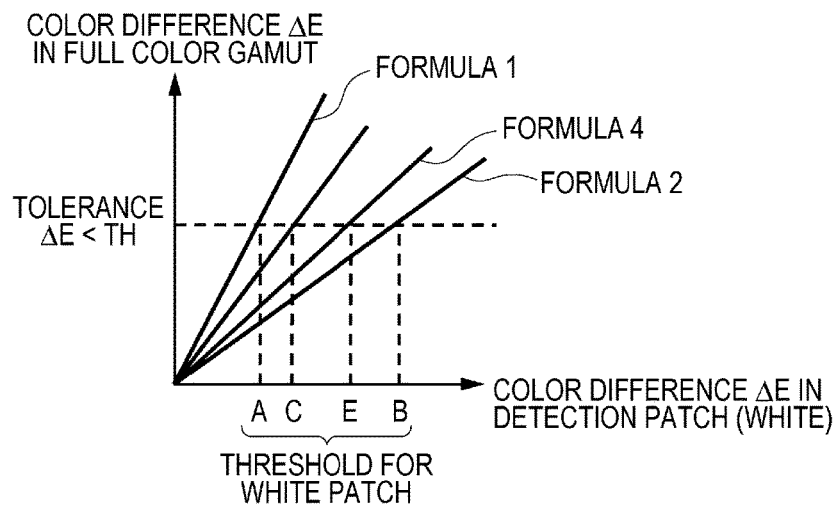
FIG. 10
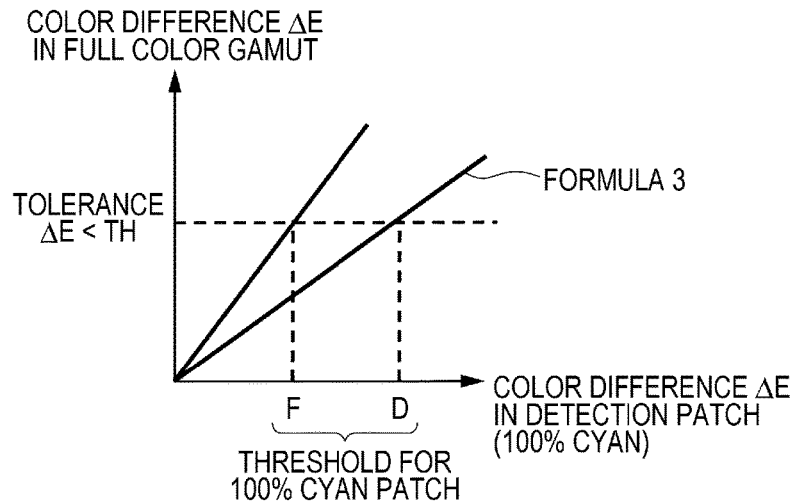

FIG. 12

| JUDGMENT THRESHOLD | SAME TYPE | MIXED TYPE | |
|---|---|---|---|
|  | WHITE | WHITE | C 100% |
| M0-M0 M2-M2 | THRESHOLD A | THRESHOLD C | THRESHOLD D |
| M0-M2 | THRESHOLD B | THRESHOLD E | THRESHOLD F |

FIG. 13

| PREDICTED-COLOR-DIFFERENCE FORMULA | SAME TYPE | MIXED TYPE | |
|---|---|---|---|
|  | WHITE | WHITE | C 100% |
| M0-M0 M2-M2 | y = ***x + *** |  | y = ***x + *** |
| M0-M2 | y = ***x + *** | y = ***x + *** | |

COLOR CORRECTION AND SELECTION OF COLOR PATCHES AND CORRECTION THRESHOLDS IN A COLOR MANAGEMENT SYSTEM, NON-TRANSITORY COMPUTER READABLE MEDIUM, AND COLOR MANAGEMENT METHOD

CROSS-REFERENCE TO RELATED APPLICATIONS

This application is based on and claims priority under 35 USC 119 from Japanese Patent Application No. 2015-159115 filed Aug. 11, 2015.

BACKGROUND (i) Technical Field

The present invention relates to a color management system, a non-transitory computer readable medium, and a color management method.

(ii) Related Art

Image forming apparatuses such as printers perform color conversion on input raster images in accordance with profile data. The profile data is generated in such a manner that a printer prints a chart pattern or color patches (hereinafter, simply referred to as "color patches") each of which serves as a color reference and colorimetry is performed on the printing result.

Meanwhile, when being performed using multiple colorimeters on color patches printed on a sheet of paper, the colorimetry produces different colorimetry results (inter-colorimeter color-differences) in some cases due to differences between the characteristics of the colorimeters (individual variations).

SUMMARY

According to an aspect of the invention, there is provided a color management system including a measurement unit and a controller. The measurement unit measures a color difference between multiple colorimeters by using at least one detection color patch in accordance with colorimetry conditions used for the colorimeters. The controller generates, in a case where the color difference between the colorimeters is equal to or higher than a threshold for the detection color patch, a correction profile for correcting the color difference between the colorimeters.

BRIEF DESCRIPTION OF THE DRAWINGS

An exemplary embodiment of the present invention will be described in detail based on the following figures, wherein:

FIG. 2 is a conceptual diagram illustrating system accuracy allocation;

FIG. 3 is a graph illustrating relationships between a paper type and a color difference;

FIG. 4 is a basic flowchart of the exemplary embodiment;

FIG. 5 is a table illustrating relationships between a colorimetry condition and a judgment threshold;

FIG. 8 is a table illustrating relationships between a colorimetry condition and a predicted-color-difference formula;

FIG. 9 is a graph illustrating relationships between a color difference in a detection patch (white) and a color difference in the full color gamut;

FIG. 10 is a graph illustrating relationships between a color difference in a detection patch (cyan) and the color difference in the full color gamut;

FIG. 12 is a table illustrating specific examples of the colorimetry condition and the judgment threshold;

FIG. 13 is a table illustrating specific examples of the colorimetry condition and a predicted-color-difference formula;

DETAILED DESCRIPTION

Hereinafter, an exemplary embodiment of the invention will be described on the basis of the drawings by taking as an example a system that remotely manages color reproduction.

Figure 1:
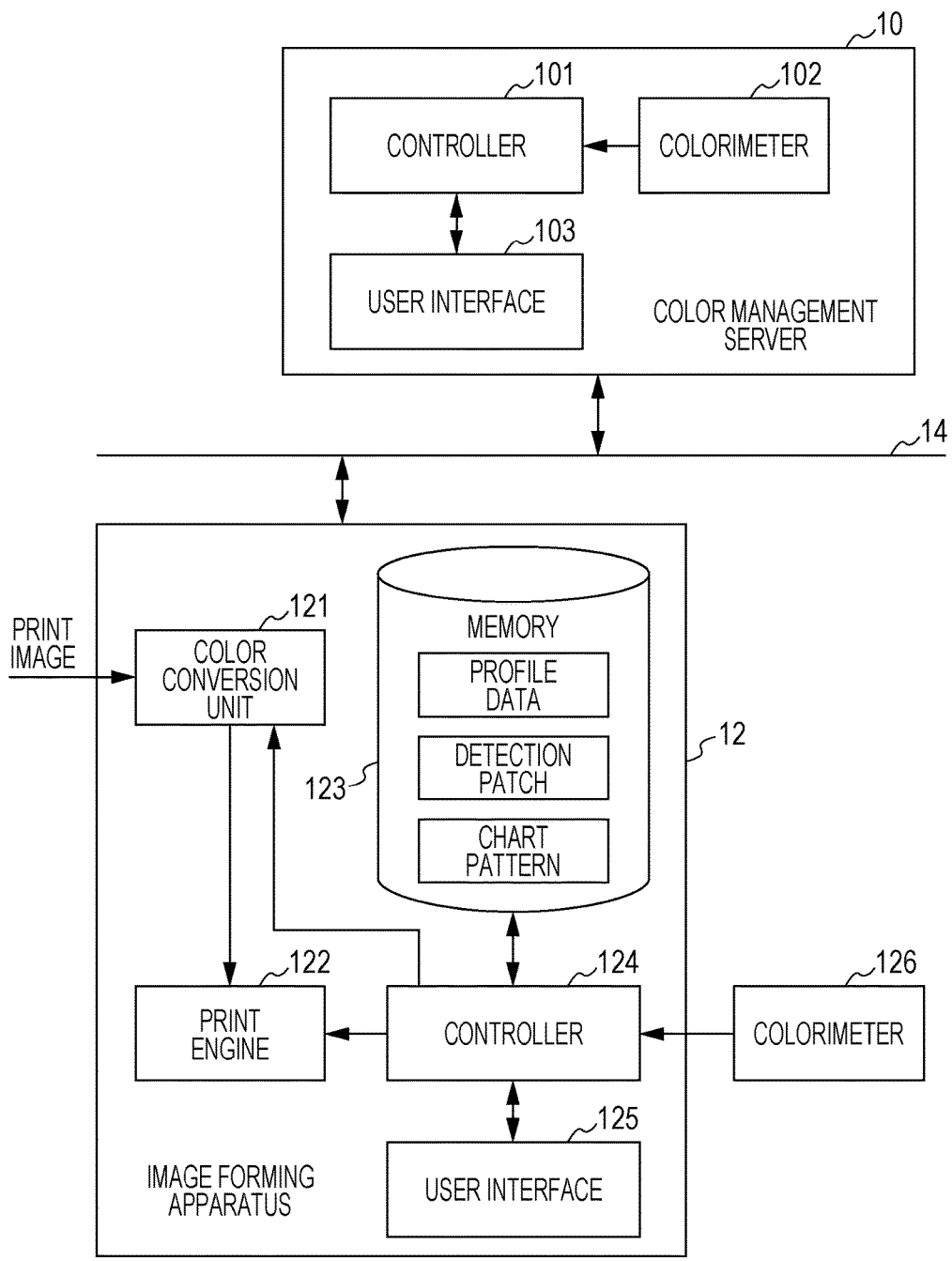
FIG. 1 is a system configuration diagram of an exemplary embodiment.

FIG. 1 is a system configuration diagram illustrating a color management system in the exemplary embodiment. The color management system includes a color management server 10 and an image forming apparatus 12. The color management server 10 and the image forming apparatus 12 are connected to each other through a network 14.

The color management server 10 includes a controller 101, a colorimeter 102, and a user interface 103. In addition to these components, the color management server 10 that is a server computer has a publicly known configuration, specifically, an input/output interface, and various types of memory (such as a program memory, a working memory, and an auxiliary memory), but these components are omitted herein. The colorimeter 102 performs measurement on color patches and supplies measurement results to the controller 101. The colorimeter 102 functions as a reference measurement device.

The image forming apparatus 12 is a printer, a multifunction printer, or a similar apparatus and includes a color conversion unit 121, a print engine 122, a memory 123, a controller 124, and a user interface 125. A colorimeter 126 may be included in the image forming apparatus 12 or may be provided separately.

The image forming apparatus 12 executes a process for printing and outputting input print image data. Examples of the print image data include bitmap image data and image data described in a page description language (PDL). In a case where the image forming apparatus 12 includes a scanner, data regarding an image read by the scanner may be used as print image data. The print image data is converted by an interpreter (not illustrated) or other image processers into a raster image processable by the print engine 122.

The color conversion unit 121 performs color conversion on the raster image in accordance with profile data. The profile data is data including information indicating a correspondence in lattice point color coordinates between an input color space and an output color space. The profile data may be, for example, an International Color Consortium (ICC) profile or a profile supporting a standard specified by the manufacturer of the image forming apparatus 12. The output color space is the color space of the print engine 122 and is typically represented by the combination of four colors of cyan (C), magenta (M), yellow (Y), and black (K). However, the colors are not limited to the four colors. The profile data is generated by the controller 124 and stored in the memory 123. For example, the profile data may be generated for each paper type and stored in the memory 123, and a user may select data suitable for used paper from multiple pieces of profile data and may then use the data. The color conversion unit 121 calculates, for each pixel of a raster image and on the basis of the profile data, color coordinates in the output color space by using the values (color coordinates) of the pixel as the values of the color coordinates in the input color space.

The print engine 122 prints an image output by the color conversion unit 121 as a result of the color conversion.

The controller 124 performs overall control of the image forming apparatus 12. For example, the controller 124 receives a printing instruction from a user through the user interface 125, controls the color conversion unit 121, the print engine 122, and other components, and performs printing of an image designated in the printing instruction. The controller 124 also executes a process for generating profile data. To generate the profile data, the print engine 122 prints a chart pattern serving as a color reference, the colorimeter 126 measures the result of printing, and the result is used for the profile data. The chart pattern is an image pattern in which, for example, color patches having different densities are arranged for each of the colors of CMYK. The data of the chart pattern is stored in the memory 123, and the controller 124 reads out the data and causes the print engine 122 to print an image.

The user interface 125 notifies the user of the state of the image forming apparatus 12 and receives designation input by the user. The user interface 125 may include a display device such as a liquid crystal touch panel and input buttons such as a keypad.

In such a system, the color reproduction characteristics of the print engine 122 of the image forming apparatus 12 are likely to change over time. To adapt to the change, the color management server 10 needs to manage the profile data. The colorimeter 102 of the color management server 10 and the colorimeter 126 of the image forming apparatus 12 use the same chart and desirably output the same measurement result. However, inter-colorimeter color-differences might be present as described above, and correction thereof is thus needed. However, colorimetry performed with multiple colorimeters by using the color patches covering the full color gamut is laborious.

In the exemplary embodiment, the controller 101 of the color management server 10 uses at least one specific color patch in accordance with the colorimetry conditions of the colorimeter 102, of the color management server 10, serving as a reference colorimeter and the colorimeter 126, of the image forming apparatus 12, serving as a target colorimeter and judges whether correction of an inter-colorimeter color-difference is needed. Only when judging that the correction is needed, the controller 101 generates a correction profile for correcting the inter-colorimeter color-difference and supplies the correction profile to the controller 124 of the image forming apparatus 12. The controller 124 supplies the correction profile to the color conversion unit 121, and the color conversion unit 121 calculates color coordinates in the output color space by using profile data corrected using the correction profile (or by replacing profile data with data in the correction profile). The controller 101 sets, in accordance with the colorimetry conditions of the two colorimeters 102 and 126, at least one color patch to be used for measuring the inter-colorimeter color-difference and outputs designation to the image forming apparatus 12. The controller 124 of the image forming apparatus 12 reads out the detection patch designated by the color management server 10 from the detection patches stored in the memory 123, causes the print engine 122 to print the detection patch, measures the color patch by using the colorimeter 126, and supplies the result to the color management server 10. The controller 101 of the color management server 10 calculates an inter-colorimeter color-difference from the measurement results obtained by the two colorimeters 102 and 126 and compares the inter-colorimeter color-difference with a threshold to judge whether correction of the inter-colorimeter color-difference is needed. Only when judging that correction is needed, the controller 101 generates a correction profile for correcting the inter-colorimeter color-difference.

The controller 101 performs processes of:

acquiring (detecting) the colorimetry conditions of the two colorimeters;

setting a particular-color detection patch (not full-color-gamut patches) for measuring an inter-colorimeter color-difference in accordance with the colorimetry conditions;

acquiring the inter-colorimeter color-difference by using the detection patch and judging whether correction is needed; and generating a correction profile only in a case where correction is judged to be needed.

The controller 101 reads out processing programs stored in the program memory, executes the programs serially, and thereby executes the processes described above.

Specifically, the colorimetry conditions used for the two colorimeters 102 and 126 include the types of the two colorimeters 102 and 126 and colorimetry modes. The colorimetry mode will further be described in detail.

FIG. 2 is a conceptual diagram illustrating system accuracy allocation in the system. A tolerance for overall system accuracy $\Delta E$ is set as $\Delta E<3$.

The system accuracy $\Delta E$ includes CMYK profile accuracy, an image output terminal (IOT) variation, and scan colorimetry accuracy, and these factors are assigned tolerances to satisfy, for example, the following conditions:

CMYK profile accuracy $\Delta E=1.5$;

an IOT variation $\Delta E=2.0$; and scan colorimetry accuracy $\Delta E<1.66$.

In addition, the scan colorimetry accuracy includes scanner accuracy and colorimeter accuracy, and these factors are assigned tolerances to satisfy the following conditions:

scanner accuracy $\Delta E=1.1$; and colorimeter accuracy $\Delta E<1.24$.

Further, the colorimeter accuracy includes repeated measurement accuracy, an individual difference, and inter-colorimeter conversion accuracy (an inter-colorimeter color-difference), and these factors are assigned tolerances to satisfy the following conditions:

repeated measurement accuracy $\Delta E=0.3$;

an individual difference $\Delta E=0.8$; and inter-colorimeter conversion accuracy (an inter-colorimeter color-difference) $\Delta E<0.9$.

In the exemplary embodiment, if the inter-colorimeter conversion accuracy (inter-colorimeter color-difference) allocated on the basis of the condition for the system accuracy tolerance $\Delta E<3$ satisfies the tolerance condition as described above, that is, if the inter-colorimeter conversion accuracy ΔE<0.9 holds true, it is judged that generation of a correction profile is not needed. Only if the inter-colorimeter conversion accuracy does not satisfy the tolerance condition, the correction profile is generated and supplied to the image forming apparatus 12.

FIG. 3 is a graph illustrating relationships between a paper type and a color difference average obtained in a case where colorimetry is performed with multiple colorimeters by using the color patches covering the full color gamut. The horizontal axis represents paper type. As the number increases from 1 to 2, 3, 4, and 5, the amount of fluorescent agent in the paper increases. As understood from FIG. 3, the color difference average varies with the paper type. Paper containing a large amount of fluorescent agent is likely to exhibit a high color difference average. Accordingly, if the paper type exhibits inter-colorimeter conversion accuracy (inter-colorimeter color-difference) ΔE that is lower than a tolerance threshold TH (0.9 in the example above), the correction profile does not need to be generated. Only in a case where the paper type exhibits inter-colorimeter conversion accuracy (inter-colorimeter color-difference) ΔE that is equal to or higher than the tolerance threshold TH, the correction profile may be generated. This indicates that the need for the correction profile may be judged on the basis of the colorimetry condition.

FIG. 4 is a basic flowchart of the exemplary embodiment. First, a goal system-color-difference $\Delta E_{sys}$ is determined. Specifically, $\Delta E_{sys}<x$ is set where a tolerance color difference is x (S101). In the example above, x=3 is set.

In a case where two colorimeters of the colorimeter 1 and the colorimeter 2 are used, the colorimeter 1 is determined as a reference colorimeter, and the colorimeter 2 is determined as a target colorimeter (S102 and S103). In FIG. 1, the colorimeter 102 is the reference colorimeter, and the colorimeter 126 is the target colorimeter.

It is judged whether an inter-colorimeter color-difference $\Delta E_{TH}$ between the colorimeter 1 and the colorimeter 2 is lower than a tolerance y (S104). The tolerance y is a value allocated on the basis of the goal system-color-difference $\Delta E_{sys}$, and corresponds to the threshold TH in the example above, for example, 0.9.

If the inter-colorimeter color-difference $\Delta E_{TH}$ is lower than the tolerance y, whether higher accuracy is needed is checked (S105). If higher accuracy is not needed, a colorimetry value is used without performing correction (S106). In other words, even though an inter-colorimeter color-difference is present, the degree of the inter-colorimeter color-difference is considered to be ignorable, and a result of colorimetry performed by the target colorimeter (colorimeter 2) is used to perform the color conversion.

If the inter-colorimeter color-difference $\Delta E_{TH}$ is equal to or higher than the tolerance y, or if higher accuracy is needed despite the inter-colorimeter color-difference $\Delta E_{TH}$ that is lower than the tolerance y, a correction profile for correcting the inter-colorimeter color-difference $\Delta E_{TH}$ is generated, and the color conversion is performed by applying the correction profile to the inter-colorimeter color-difference $\Delta E_{TH}$ (S107 and S108).

When the judgment in step S104 is performed, that is, when it is judged whether the inter-colorimeter color-difference $\Delta E_{TH}$ is lower than the tolerance y, the fact that the inter-colorimeter color-difference $\Delta E_{TH}$ varies with the colorimetry condition is utilized. The colorimetry conditions include the types of colorimeters (the same type or mixed different types) and colorimetry modes described as M0 to M3 in International Organization for Standardization (ISO) standards. Paper not containing a fluorescent whitening agent has a color measurement value that corresponds to the appearance of the color in an observation booth. However, paper containing the fluorescent whitening agent has a color measurement value that does not correspond to the appearance of the color in the observation booth. This is caused by a difference in the ultraviolet (UV) component between light emitted from the light source of the colorimeter and light used as illumination for observation. If a measurement result is changed due to the difference in the UV component in the illumination as described above, the color management is largely influenced. Hence, ISO has revised the illumination conditions for colorimeters and defined standard illumination conditions for colorimeters that match standard illuminants. Specifically, the conditions are as follows.

M0 is an illumination condition for International Commission on Illumination (CIE) Illuminant A and is an illumination condition for incandescent lamps having spectral distribution close to that of a color temperature of 2856 K±100 K. M0 is typically used in a case where paper or a color material does not emit fluorescence.

M1 is an illumination condition that matches CIE illuminant D50. Part 1 of the condition is used in a case where paper, a color material, or both emit fluorescence. Part 2 is used in a case where paper emits fluorescence and where a color material does not emit fluorescence.

M2 is an illumination condition for UV blocking (a case where a UV-blocking filter is attached) and is used in a case where paper emits fluorescence and where preventing the influence of UV on data is desired.

M3 is an illumination condition for a polarizing filter and is used in a case where a polarizing filter is used to minimize surface reflection.

Among these colorimetry modes, M0 that is an industry standard and M2 that influences an inter-colorimeter color-difference are focused in the exemplary embodiment. An inter-colorimeter color-difference is judged separately for cases where the two colorimeters 1 and 2 both apply to M0, where the two colorimeters 1 and 2 both apply to M2, and where the two colorimeters 1 and 2 apply to the combination of M0 and M2.

FIG. 5 illustrates examples of thresholds for the colorimetry conditions in the exemplary embodiment. The colorimetry conditions include the types of colorimeters (the same type or mixed types) and the colorimetry modes (M0-M0, M2-M2, and M0-M2). In accordance with such combinations, color patches and thresholds that are to be used are set.

Specifically, in a case where the types of colorimeters are the same type and where the colorimetry modes are both M0 or M2, judgment is performed by using a white patch on the basis of a threshold A.

In a case where the types of colorimeters are the same type and where the colorimetry modes are M0 and M2, respectively, judgment is performed by using the white patch on the basis of a threshold B.

In a case where the types of colorimeters are different mixed types and where the colorimetry modes are both M0 or M2, judgment is performed by using a 100% cyan (C) patch in addition to the white patch on the basis of thresholds C and D.

In a case where the types of colorimeters are different mixed types and where the colorimetry modes are M0 and M2, respectively, judgment is performed by using the 100% cyan (C) patch in addition to the white patch on the basis of thresholds E and F.

Note that in the exemplary embodiment, judgment is performed by using only the white patch in the case where the types of colorimeters are the same type, and judgment is performed by using combination of only the white and cyan patches in the case where the types of colorimeters are different mixed types. In the case where the types of colorimeters are the same type, the degree of correlation in inter-colorimeter color-difference between the white patch and the full-color-gamut patches is high, that is, equal to or higher than 0.8. Accordingly, an inter-colorimeter color-difference only in the white patch may be used for evaluating an inter-colorimeter color-difference in the full-color-gamut patches. In contrast, in the case where the types of colorimeters are different mixed types, the degree of correlation of only the white patch is not sufficient. The use of the cyan patch having a high degree of correlation in addition to the white patch may substitute the use of the full-color-gamut patches for evaluating an inter-colorimeter color-difference.

In other words, in the exemplary embodiment, at least one particular color patch, not full-color-gamut patches, is used in accordance with the colorimetry conditions used for the multiple colorimeters. In addition, a threshold for the particular color patch is used to judge whether an inter-colorimeter color-difference is lower than the threshold. Only in a case where the inter-colorimeter color-difference is equal to or higher than the threshold, a correction profile for correcting the inter-colorimeter color-difference is generated.

Figure 6:
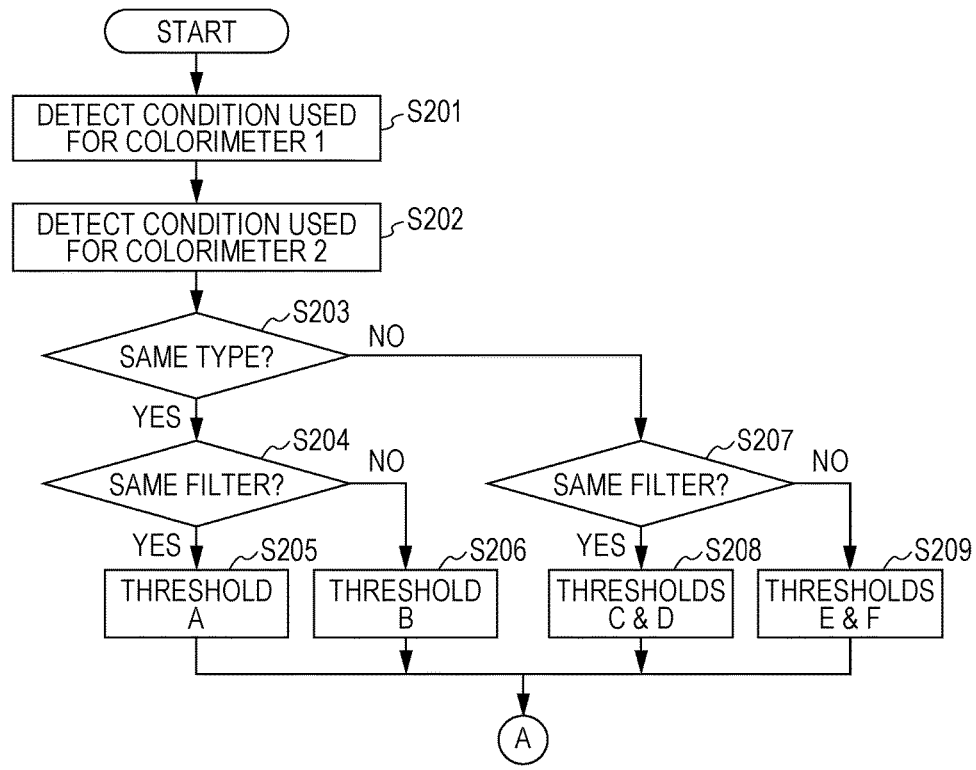
FIG. 6 is a first detailed flowchart of the exemplary embodiment.
Figure 7:
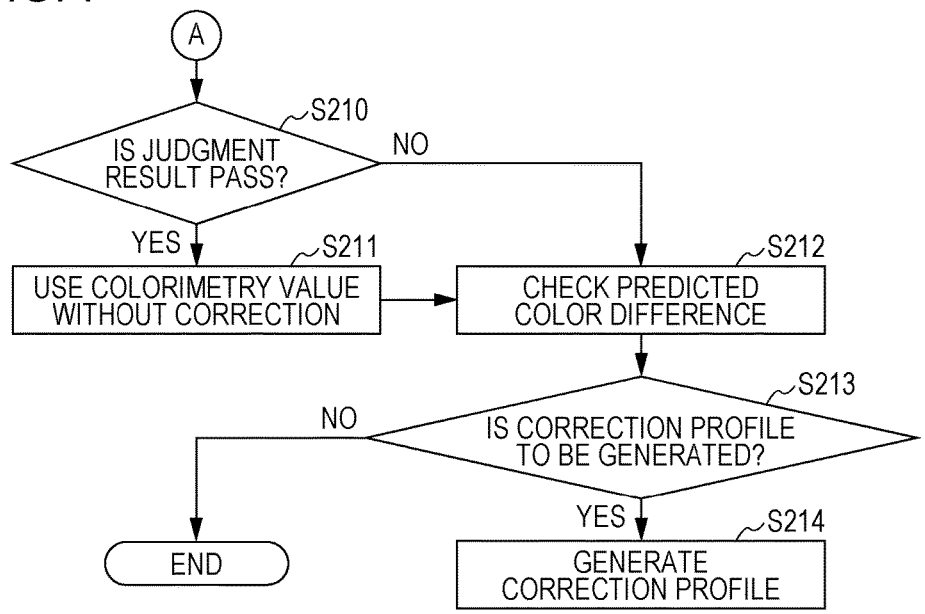
FIG. 7 is a second detailed flowchart of the exemplary embodiment.

FIGS. 6 and 7 are detailed flowcharts in the exemplary embodiment.

In FIG. 6, the colorimetry conditions used for the colorimeter 1 as the reference colorimeter and the colorimeter 2 as the target colorimeter are first detected (S201 and S202). With reference to FIG. 1, the controller 101 detects the colorimetry conditions used for the colorimeter 102 and the colorimeter 126, respectively. The colorimetry condition used for the colorimeter 126 may be detected by receiving data transmitted from the controller 124.

The controller 101 judges whether the types of the colorimeters 1 and 2 are the same type (S203). If the types are the same type, the controller 101 judges whether colorimetry modes are the same mode, that is, whether filters are the same filter (S204). In the judgment, if the colorimeters 1 and 2 are both M0 or M2, the controller 101 judges that the filters are the same filter. If the filters are the same filter (M0-M0 or M2-M2), the threshold A is used (S205). If filters are not the same filter (M0-M2), the threshold B is used (S206).

If the types of the colorimeters 1 and 2 are not the same type, the controller 101 judges whether the colorimetry modes are the same mode, that is, whether filters are the same filter (S207). If filters are the same filter, the judgment is performed using the thresholds C and D on the basis of the AND condition (S208). If filters are not the same filter, the judgment is performed using the thresholds E and F on the basis of the AND condition (S209). The thresholds C and E are thresholds for the use of the white patch, and the thresholds D and F are thresholds for the use of the cyan patch.

In FIG. 7, the controller 101 judges whether the judgment result is Pass, that is, whether an inter-colorimeter color-difference is lower than the corresponding threshold (S210). If an inter-colorimeter color-difference is lower than the threshold, the corresponding colorimetry value may be used without performing correction (S211). If the judgment result is not Pass, that is, if an inter-colorimeter color-difference is equal to or higher than the threshold, the controller 101 checks a predicted color difference to be obtained in a case of using the full-color-gamut patches (S212) and judges whether to generate a correction profile (S213). If the judgment in step S210 results in YES, the controller 101 also checks the predicted color difference but basically does not generate the correction profile. If the judgment in step S210 results in NO, the controller 101 generates the correction profile (S214). However, if the calculated predicted color difference is lower than the corresponding threshold, the controller 101 does not need to generate the correction profile.

FIG. 8 illustrates prediction formulae each for calculating a predicted color difference, that is, an inter-colorimeter color-difference in the full-color-gamut patches that is predicted in accordance with an inter-colorimeter color-difference obtained using the white patch or the cyan patch.

Formula 1 is used to calculate a predicted color difference in the case where the judgment is performed using the white patch on the basis of the threshold A if the types of colorimeters are the same type and if the colorimetry modes are both M0 or M2.

Formula 2 is used to calculate a predicted color difference in the case where the judgment is performed using the white patch on the basis of the threshold B if the types of colorimeters are the same type and if the colorimetry modes are M0 and M2, respectively.

Formula 3 is used to calculate a predicted color difference in the case where the judgment is performed using the 100% cyan (C) patch in addition to the white patch on the basis of the thresholds C and D if the types of colorimeters are different mixed types and if the colorimetry modes are both M0 or M2.

Formula 4 is used to calculate a predicted color difference in the case where the judgment is performed using the 100% cyan (C) patch in addition to the white patch on the basis of the thresholds E and F if the types of colorimeters are different mixed types and if the colorimetry modes are M0 and M2, respectively.

Formulae 1 to 4 each define a correlation between an inter-colorimeter color-difference in the white or cyan patch and an inter-colorimeter color-difference in the full-color-gamut patches. Formulae 1 to 4 are each obtained as an approximation obtained in such a manner that inter-colorimeter color-differences in the white or cyan patch and inter-colorimeter color-differences (color difference averages) in the full-color-gamut patches are plotted on a two-dimensional coordinate system and that relationships therebetween are subjected to linear approximation.

FIG. 9 illustrates relationships between an inter-colorimeter color-difference in the case of using the white patch as a detection patch and an inter-colorimeter color-difference in the case of using the full-color-gamut patches.

Formula 1 is a correlation formula obtained in the case where the types of colorimeters are the same type and where the colorimetry modes are M0-M0 or M2-M2. Formula 1 is obtained in such a manner that in the case where the types of colorimeters are the same type and where the colorimetry modes are M0-M0 or M2-M2, inter-colorimeter color-differences in the white patch and inter-colorimeter color-differences (color difference averages) in the full-color-gamut patches are plotted on the two-dimensional coordinate system and that relationships therebetween are subjected to linear approximation. In a case where the tolerance TH for an inter-colorimeter color-difference in the full-color-gamut patches is 0.9, a threshold corresponding to the value of 0.9 for the inter-colorimeter color-difference in the white patch is the threshold A.

Formula 2 is a correlation formula obtained in the case where the types of colorimeters are the same type and where the colorimetry modes are M0-M2. Formula 2 is obtained in such a manner that in the case where the types of colorimeters are the same type and where the colorimetry modes are M0-M2, inter-colorimeter color-differences in the white patch and inter-colorimeter color-differences (color difference averages) in the full-color-gamut patches are plotted on the two-dimensional coordinate system and that relationships therebetween are subjected to linear approximation. In the case where the tolerance TH for an inter-colorimeter color-difference in the full-color-gamut patches is 0.9, a threshold corresponding to the value of 0.9 for the inter-colorimeter color-difference in the white patch is the threshold B.

Formula 4 is a correlation formula obtained in the case where the types of colorimeters are the mixed types and where the colorimetry modes are M0-M2. Formula 4 is obtained in such a manner that in the case where the types of colorimeters are the mixed types and where the colorimetry modes are M0-M2, inter-colorimeter color-differences in the white patch and inter-colorimeter color-differences (color difference averages) in the full-color-gamut patches are plotted on the two-dimensional coordinate system and that relationships therebetween are subjected to linear approximation. In the case where the tolerance TH for an inter-colorimeter color-difference in the full-color-gamut patches is 0.9, a threshold corresponding to the value of 0.9 for the inter-colorimeter color-difference in the white patch is the threshold E.

FIG. 10 illustrates relationships between an inter-colorimeter color-difference in the case of using the 100% cyan (C) patch as a detection patch and an inter-colorimeter color-difference in the case of using the full-color-gamut patches.

Formula 3 is a correlation formula obtained in the case where the types of colorimeters are mixed types and where the colorimetry modes are M0-M0 or M2-M2. Formula 3 is obtained in such a manner that in the case where the types of colorimeters are mixed types and where the colorimetry modes are M0-M0 or M2-M2, inter-colorimeter color-differences in the cyan patch and inter-colorimeter color-differences (color difference averages) in the full-color-gamut patches are plotted on the two-dimensional coordinate system and that relationships therebetween are subjected to linear approximation. In the case where the tolerance TH for an inter-colorimeter color-difference in the full-color-gamut patches is 0.9, a threshold corresponding to the value of 0.9 for the inter-colorimeter color-difference in the cyan patch is the threshold D.

Note that in the case where the types of the colorimeters are mixed types, two types of patches that are the white and cyan patches are used as detection patches. The two detection patches are used to set a prediction formula by specifying a relational expression for each of the respective two detection patches that has higher sensitivity than the other, that is, a relational expression that enables more accurate prediction of an inter-colorimeter color-difference in the full color gamut. Lines not denoted by formula names in FIGS. 9 and 10, respectively, represent formulae that have lower sensitivity than the corresponding ones and are thus not selected.

Figure 11:
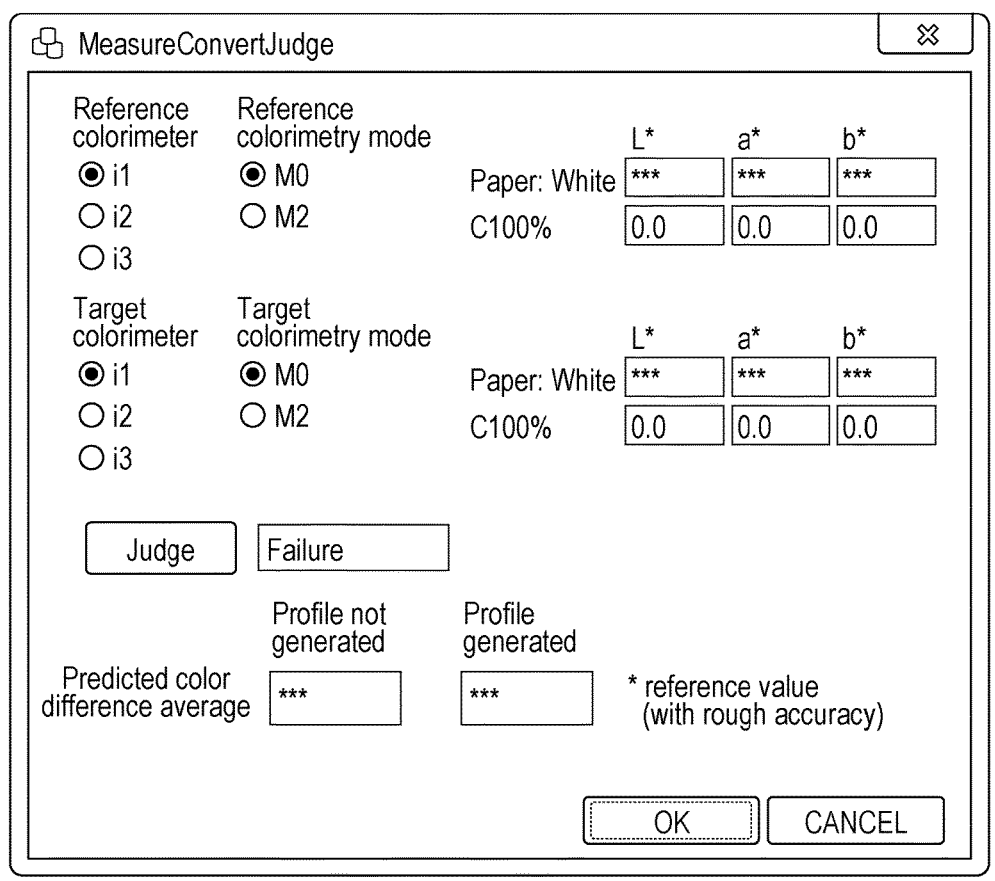
FIG. 11 is an explanatory diagram illustrating an example of a user interface (UI) screen.

FIG. 11 illustrates an example of a UI screen in the exemplary embodiment. The screen illustrated in FIG. 11 is a screen displayed on the user interface 103 of the color management server 10 or the user interface 125 of the image forming apparatus 12. For each of the reference colorimeter and the target colorimeter, the type of the colorimeter and the colorimetry mode are detected. In FIG. 11, the types of the reference colorimeter and the target colorimeter are both detected as i1 and the modes thereof are both detected as M0. Since the colorimetry conditions in which the types of the colorimeters are the same type and in which the colorimetry modes are M0-M0, the white patch and the threshold A are set at this time as the detection patch and the threshold, respectively. For example, consider a case where an inter-colorimeter color-difference obtained using the white patch is 1 and where the threshold A is 0.9. Since the inter-colorimeter color-difference is higher than the threshold, the judgment result is Failure, that is, it is judged that a correction profile needs to be generated. In addition, a predicted color difference at this time is calculated using Formula 1. Further, a predicted color difference to be obtained when the correction profile is applied may be calculated and displayed.

FIG. 12 illustrates examples of the judgment thresholds.

Note that the thresholds above are thresholds for the detection patches and are different from the threshold for the inter-colorimeter color-difference $\Delta E_{TH}$ in the full-color-gamut patches. In addition, as described above, the AND condition is used between the thresholds C and D and between the thresholds E and F. Accordingly, if an inter-colorimeter color-difference obtained as a result of measurement is lower than the threshold C but is equal to or higher the threshold D, the judgment results in Failure. Likewise, if an inter-colorimeter color-difference obtained as a result of measurement is lower than the threshold E but is equal to or higher than the threshold F, the judgment results in Failure.

FIG. 13 illustrates examples of the predicted-color-difference formulae.

Note that x is an inter-colorimeter color-difference obtained using a detection patch, and y is a color difference average in the full-color-gamut patches.

As described above, in the exemplary embodiment, the full-color-gamut patches are not used to measure an inter-colorimeter color-difference unlike a round-robin system, and at least one particular color patch is selectively used in accordance with the colorimetry conditions to measure an inter-colorimeter color-difference. The obtained inter-colorimeter color-difference is compared with the judgment threshold to judge whether the inter-colorimeter color-difference needs to be corrected. Only in a case where the inter-colorimeter color-difference is equal to or higher than the judgment threshold and thus needs to be corrected, a correction profile is generated. Accordingly, labor taken in the colorimetry may be reduced in comparison with a case where color patches covering the full color gamut are used to perform colorimetry by using multiple colorimeters to which correction is applied.

In the exemplary embodiment, the white patch is used in the case where the types of colorimeters are the same type, and the white and cyan patches are used in the case where the types of colorimeters are mixed types. However, in particular in the case of the mixed types, another patch, for example, a magenta patch may be used instead of the cyan patch.

Figure 14:
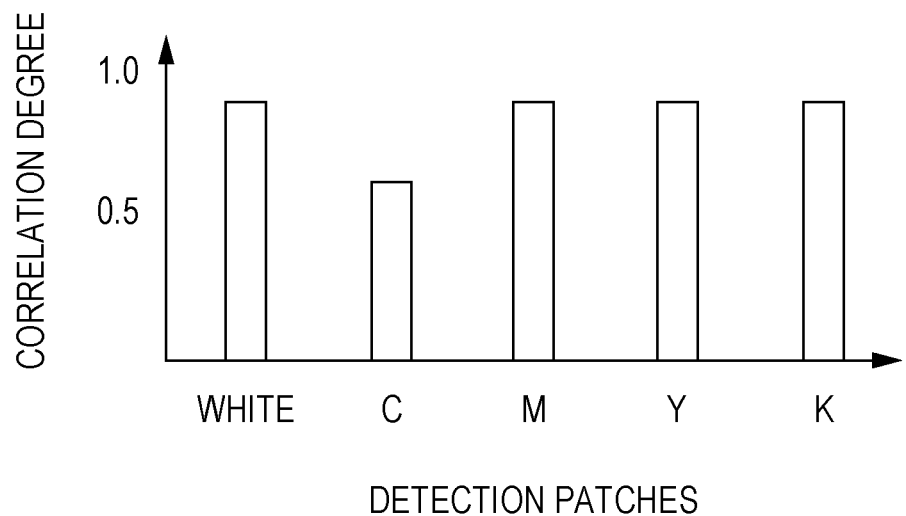
FIG. 14 is a graph illustrating the degree of correlation of detection patches in a case of the colorimetry condition in which the same type is set.

FIG. 14 illustrates the degree of correlation in inter-colorimeter color-differences between an average of the full-color-gamut patches and a detection patch used in the case where the types of colorimeters are the same type and where the colorimetry modes are the same mode. Detection patches in FIG. 14 are the white, cyan (C), magenta (M), yellow (Y), and black (K) patches. The white, magenta, yellow, and black patches exhibit almost the same high degree of correlation. Accordingly, the use of only the white patch enables highly accurate evaluation of an inter-colorimeter color-difference to be obtained in the case of using the full-color-gamut patches.

Figure 15:
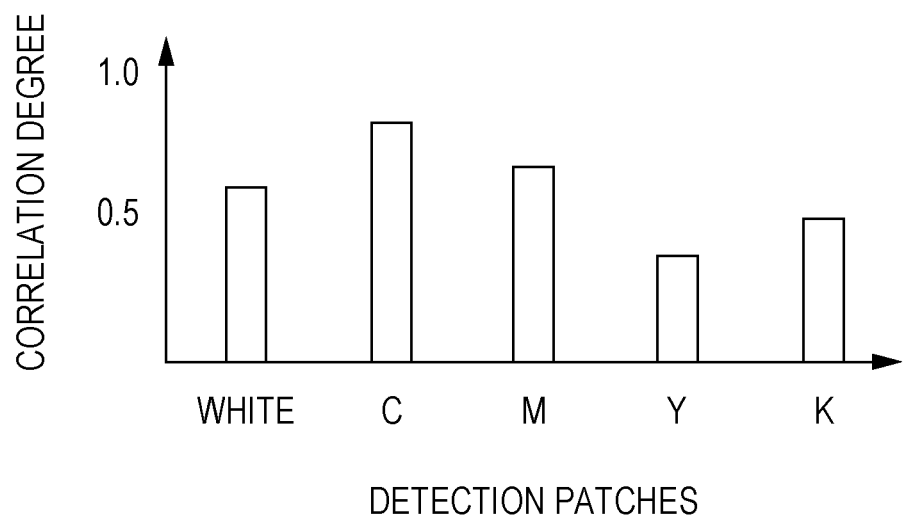
FIG. 15 is a graph illustrating the degree of correlation of the detection patches in a case of the colorimetry condition in which mixed types are set.

FIG. 15 illustrates the degree of correlation in inter-colorimeter color-differences between an average of the full-color-gamut patches and a detection patch used in the case where the types of colorimeters are mixed types and where the colorimetry modes are the same mode. Detection patches in FIG. 15 are the white, cyan (C), magenta (M), yellow (Y), and black (K) patches. The cyan patch has the highest degree of correlation, followed by the magenta patch, the white patch, the black patch, and the yellow patch in this order. Accordingly, the use of only the white patch does not ensure sufficient accuracy, and thus the cyan patch may be used in addition to the white patch. However, the magenta patch may be used instead of the cyan patch.

In the exemplary embodiment, the judgment is performed by comparing an inter-colorimeter color-difference with the threshold, and the judgment result is displayed as Pass or Failure as illustrated in FIG. 11. In the case of Failure, the correction profile is automatically generated. However, a predicted color difference may be calculated and displayed, and in a case where a user checks the predicted color difference and designates generation of the correction profile, generation of the correction profile may be executed. Since the judgment in the exemplary embodiment is based on a particular detection patch, not the full-color-gamut patches, a user might wish to know a color difference average based on the full-color-gamut patches. In such a case, it is useful to display and present a calculated predicted color difference to the user.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color management system comprising:
   at least one hardware processor configured to implement:
   a measurement unit that measures a color difference between a plurality of colorimeters by using at least one detection color patch in accordance with colorimetry conditions used for the colorimeters; and
   a controller that generates, in a case where the color difference between the colorimeters is equal to or higher than a threshold for the detection color patch, a correction profile for correcting the color difference between the colorimeters, wherein
   the colorimetry conditions include types of the plurality of colorimeters and colorimetry modes, and
   in a case where the types of the plurality of colorimeters are different and where the colorimetry modes are identical, the detection color patches are a white patch and a cyan patch.

2. The color management system according to claim 1, wherein in a case where the types of the plurality of colorimeters are identical and where the colorimetry modes are identical, the detection color patch is the white patch.

3. The color management system according to claim 2, wherein the controller computes, from the color difference between the colorimeters, a predicted color difference to be obtained in a case where full-color-gamut patches are used and outputs the predicted color difference.

4. The color management system according to claim 1, wherein in a case where the types of the plurality of colorimeters are identical and where the colorimetry modes are different, the detection color patch is the white patch.

5. The color management system according to claim 4, wherein the controller computes, from the color difference between the colorimeters, a predicted color difference to be obtained in a case where full-color-gamut patches are used and outputs the predicted color difference.

6. The color management system according to claim 1, wherein in a case where the types of the plurality of colorimeters are different and where the colorimetry modes are different, the detection color patches are the white patch and the cyan patch.

7. The color management system according to claim 6, wherein the controller computes, from the color difference between the colorimeters, a predicted color difference to be obtained in a case where full-color-gamut patches are used and outputs the predicted color difference.

8. The color management system according to claim 1, wherein the controller computes, from the color difference between the colorimeters, a predicted color difference to be obtained in a case where full-color-gamut patches are used and outputs the predicted color difference.

9. A non-transitory computer readable medium storing a program causing a computer to execute a process comprising:
   measuring a color difference between a plurality of colorimeters by using a detection color patch in accordance with colorimetry conditions used for the colorimeters; and
   generating, in a case where the color difference between the colorimeters is equal to or higher than a threshold for the detection color patch, a correction profile for correcting the color difference between the colorimeters, wherein
   the colorimetry conditions include types of the plurality of colorimeters and colorimetry modes, and
   in a case where the types of the plurality of colorimeters are different and where the colorimetry modes are identical, the detection color patches are a white patch and a cyan patch.

10. A color management method comprising:
    measuring a color difference between a plurality of colorimeters by using a detection color patch in accordance with colorimetry conditions used for the colorimeters; and
    generating, in a case where the color difference between the colorimeters is equal to or higher than a threshold for the detection color patch, a correction profile for correcting the color difference between the colorimeters, wherein
    the colorimetry conditions include types of the plurality of colorimeters and colorimetry modes, and
    in a case where the types of the plurality of colorimeters are different and where the colorimetry modes are identical, the detection color patches are a white patch and a cyan patch.

* * * * *